(12) United States Patent
Sunazuka

(10) Patent No.: US 12,382,877 B2
(45) Date of Patent: Aug. 12, 2025

(54) GARDENING TRIMMER

(71) Applicant: Makita Corporation, Anjo (JP)

(72) Inventor: Ryo Sunazuka, Anjo (JP)

(73) Assignee: MAKITA CORPORATION, Anjo (JP)

( * ) Notice: Subject to any disclaimer, the term of this patent is extended or adjusted under 35 U.S.C. 154(b) by 345 days.

(21) Appl. No.: 17/633,276

(22) PCT Filed: Jul. 7, 2020

(86) PCT No.: PCT/JP2020/026613
§ 371 (c)(1),
(2) Date: Feb. 7, 2022

(87) PCT Pub. No.: WO2021/024684
PCT Pub. Date: Feb. 11, 2021

(65) Prior Publication Data
US 2022/0354061 A1 Nov. 10, 2022

(30) Foreign Application Priority Data
Aug. 8, 2019 (JP) ................ 2019-146335

(51) Int. Cl.
*A01G 3/053* (2006.01)
*A01D 34/10* (2006.01)
(Continued)

(52) U.S. Cl.
CPC ............ *A01G 3/053* (2013.01); *A01D 34/10* (2013.01); *A01D 34/30* (2013.01); *F16H 21/18* (2013.01)

(58) Field of Classification Search
CPC ...... A01G 3/047; A01G 3/0475; A01G 3/053; A01D 34/30; A01D 34/305
(Continued)

(56) References Cited

U.S. PATENT DOCUMENTS 2,790,295 A * 4/1957 Collins ................. F16F 15/22
74/50
6,698,177 B1 3/2004 Akehi et al.
(Continued)

FOREIGN PATENT DOCUMENTS

| CN | 102308723 A | 1/2012 |
|---|---|---|
| JP | 06-017434 U | 3/1994 |

(Continued)

OTHER PUBLICATIONS

Written Opinion of the International Searching Authority dated Oct. 6, 2020 in International Application No. PCT/JP2020/026613.
(Continued)

*Primary Examiner* — Adam J Eiseman
*Assistant Examiner* — Richard D Crosby, Jr.
(74) *Attorney, Agent, or Firm* — Sughrue Mion, PLLC

(57) ABSTRACT

A cam member includes an intermediate disk, a first eccentric cam disposed on an upper surface of the intermediate disk and connected to a first blade and a second eccentric cam disposed on a lower surface of the intermediate disk and connected to a second blade. A center of gravity of the first eccentric is positioned in a first direction from a rotation axis of the cam member. A center of gravity of the second eccentric cam is positioned in a second direction opposite to the first direction from the rotation axis. A center of gravity of an upper half of the intermediate disk is positioned in the second direction from the rotation axis. A center of gravity of lower half of the intermediate disk is positioned in the first direction from the rotation axis.

11 Claims, 7 Drawing Sheets

(51) Int. Cl.
*A01D 34/30* (2006.01)
*F16H 21/18* (2006.01)

(58) Field of Classification Search
USPC .................................................. 30/215–220
See application file for complete search history.

(56) References Cited

U.S. PATENT DOCUMENTS

| | | | | |
|---|---|---|---|---|
| 7,788,811 | B2* | 9/2010 | Hanada | A01G 3/053 74/567 |
| 8,028,423 | B2* | 10/2011 | Matsuo | A01G 3/053 30/220 |
| 8,397,389 | B2* | 3/2013 | Geromiller | A01G 3/053 30/220 |
| 9,357,711 | B2* | 6/2016 | Kato | A01G 3/053 |
| 10,136,584 | B1* | 11/2018 | Cours | F16H 1/30 |
| 10,798,876 | B2* | 10/2020 | Milus | F16H 21/22 |
| 10,827,673 | B2* | 11/2020 | Cook | A01D 69/06 |
| 11,185,015 | B2* | 11/2021 | Chung | H02K 7/108 |
| 2002/0124419 | A1* | 9/2002 | Hirabayashi | B23D 51/10 30/329 |
| 2008/0134521 | A1 | 6/2008 | Hanada et al. | |
| 2008/0196376 | A1* | 8/2008 | Berti | A01G 3/053 30/393 |
| 2010/0218967 | A1* | 9/2010 | Ro kamp | A01G 3/053 173/217 |
| 2011/0179651 | A1* | 7/2011 | Hittmann | A01G 3/053 30/216 |
| 2012/0017447 | A1 | 1/2012 | Nie et al. | |
| 2012/0036722 | A1* | 2/2012 | Hittmann | A01G 3/053 30/216 |
| 2012/0167394 | A1* | 7/2012 | Lugert | A01G 3/053 30/223 |
| 2014/0007717 | A1* | 1/2014 | Kato | F16H 21/18 74/49 |
| 2015/0150194 | A1* | 6/2015 | Wang | A01G 3/053 30/277.4 |
| 2015/0223401 | A1* | 8/2015 | Schiedt | A01G 3/06 30/277.4 |
| 2016/0007542 | A1* | 1/2016 | Stones | A01G 3/053 30/216 |
| 2016/0227710 | A1* | 8/2016 | Pan | A01G 3/053 |
| 2016/0242365 | A1* | 8/2016 | Li | F16H 1/02 |
| 2016/0330914 | A1* | 11/2016 | Tang | A01G 3/053 |
| 2017/0303474 | A1* | 10/2017 | Sheffer | A01G 3/053 |
| 2020/0196533 | A1* | 6/2020 | Wu | A01G 3/053 |
| 2021/0100170 | A1* | 4/2021 | Suzuki | A01G 3/053 |

FOREIGN PATENT DOCUMENTS

| | | |
|---|---|---|
| JP | 2000-217431 A | 8/2000 |
| JP | 2004-208372 A | 7/2004 |
| JP | 2010-158205 A | 7/2010 |

OTHER PUBLICATIONS

International Search Report of PCT/JP2020/026613 dated Oct. 6, 2020 [PCT/ISA/210].
Tang, "Balance of Auto Parts", China Communications Press, vol. 2, pp. 1-12, 1980 (18 pages total).
Office Action dated Nov. 23, 2022 from the China National Intellectual Property Administration in CN Application No. 202080054314.3.

* cited by examiner

GARDENING TRIMMER

CROSS REFERENCE TO RELATED APPLICATIONS

This application is a National Stage of International Application No. PCT/JP2020/026613 filed on Jul. 7, 2020, claiming priority based on Japanese Patent Application No. 2019-146335 filed on Aug. 8, 2019.

TECHNICAL FIELD

The disclosure herein relates to gardening trimmers such as hedge trimmers and lawn mowers.

BACKGROUND

Various types of gardening trimmers such as hedge trimmers and lawn mowers are known. In general, a gardening trimmer has a prime mover (such as an engine or a motor), a cam member configured to be rotated by the prime mover, and a pair of blades connected to the cam member. The pair of blades is configured to reciprocate in opposite phases to each other in accordance with rotation of the cam member. For example, Japanese Patent Application Publication No. 116-17434 describes an example of such a gardening trimmer.

SUMMARY

The cam member includes a first eccentric cam connected to a first blade and a second eccentric cam connected to a second blade. The first and second eccentric cams are arranged along a rotation axis of the cam member, and are offset in opposite directions from each other with respect to the rotation axis of the cam member. With such a configuration, couple imbalance is inevitably present in the cam member, as a result of which unnecessary vibration and noise are generated accompanying rotation of the cam member.

In view of the aforementioned circumstance, the disclosure herein provides art to reduce couple imbalance in a cam member.

An aspect of the art disclosed herein provides a gardening trimmer. This gardening trimmer comprises: a prime mover; a cam member configured to be rotated by the prime mover; and a first blade and a second blade connected to the cam member, the first blade and the second blade being configured to reciprocate in opposite phases to each other in accordance with rotation of the cam member. The cam member comprises: an intermediate disk: a first eccentric cam disposed on an upper surface of the intermediate disk and connected to the first blade; and a second eccentric cam disposed on a lower surface of the intermediate disk and connected to the second blade. A center of gravity of the first eccentric cam is positioned in a first direction from a rotation axis of the cam member, and a center of gravity of the second eccentric cam is positioned in a second direction opposite to the first direction from the rotation axis of the cam member. A center of gravity of an upper half of the intermediate disk proximate to the first eccentric cam is positioned in the second direction from the rotation axis of the cam member, and a center of gravity of a lower half of the intermediate disk proximate to the second eccentric cam is positioned in the first direction from the rotation axis of the cam member. Here, the upper and lower halves of the intermediate disk are assumed as having a dimension (that is, thickness) being the same as each other in a direction parallel to the rotation axis.

In the aforementioned configuration, couple imbalance is deliberately given to the intermediate disk of the cam member, and couple imbalance caused by the first and second eccentric cams is at least partly cancelled by this couple imbalance given to the intermediate disk. Due to this, couple imbalance of the cam member as a whole is thereby reduced, and unnecessary vibration and noise accompanying rotation of the cam member can be reduced.

EMBODIMENTS

Figure 1:
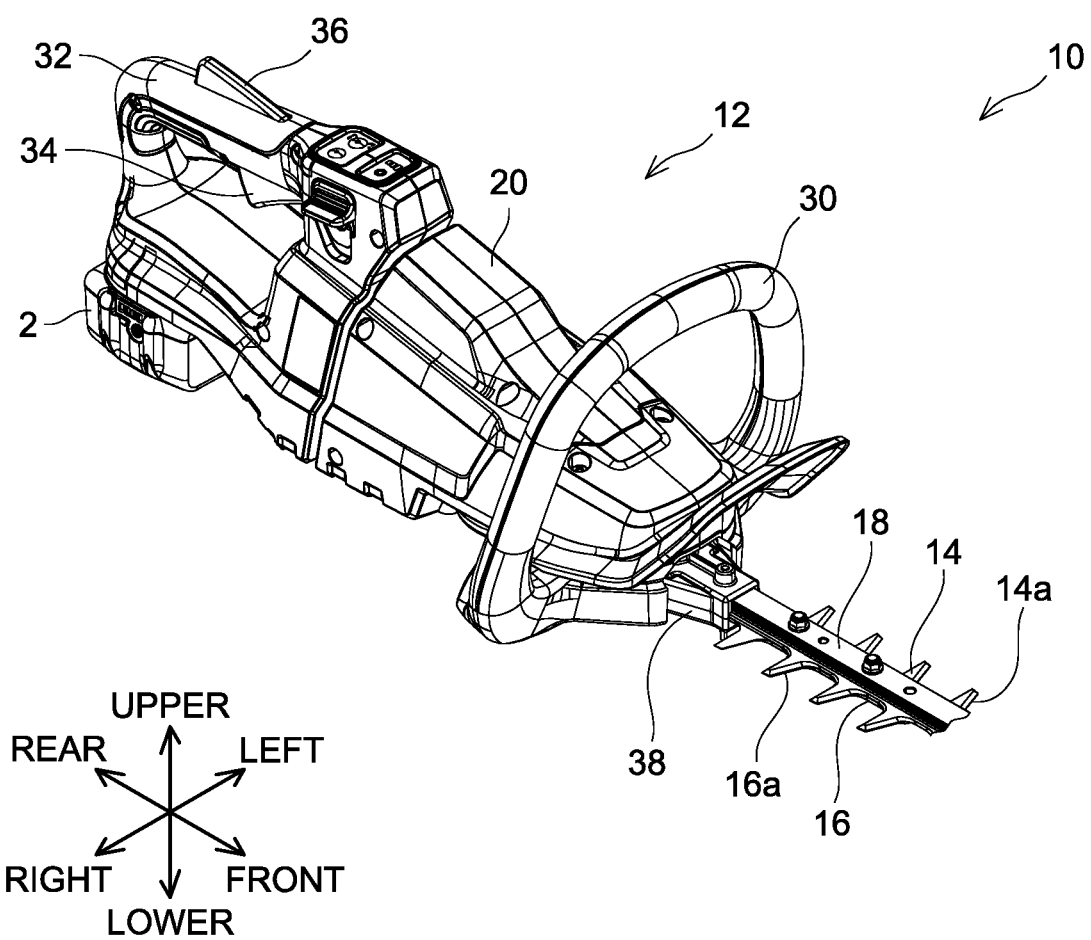
FIG. 1 is a perspective view showing an outer appearance of a gardening trimmer 10 of an embodiment.

In an embodiment of the art disclosed herein, the intermediate disk of the cam member may comprise at least one blind hole defined in a thickness direction of the intermediate disk (that is, a direction parallel to the rotation axis of the cam member). By defining such a blind hole in the intermediate disk, desired couple balance can be given to the intermediate disk. Here, the blind hole may be defined at where the first eccentric cam or the second eccentric cam is, or may be defined at a position separated away from the first eccentric cam and the second eccentric cam.

In the aforementioned embodiment, the at least one blind hole may include a first blind hole that passes through the first eccentric cam and extends to the intermediate disk. According to such a configuration, a mass of the first eccentric cam is reduced, by which couple imbalance caused by the first eccentric cam can be reduced.

In addition to the above or as an alternative thereto, the at least one blind hole may include a second blind hole that passes through the second eccentric cam and extends to the intermediate disk. According to such a configuration, a mass of the second eccentric cam is reduced, by which couple imbalance caused by the second eccentric cam can be reduced.

In an embodiment of the art disclosed herein, the at least one blind hole may be at least partially filled with a filler member that has a smaller density than a material of the intermediate disk. According to such a configuration, for example, fine adjustment may be made to couple imbalance of the intermediate disk, and rigidity of the cam member may be increased.

In an embodiment of the art disclosed herein, the intermediate disk of the cam member may be constituted of at least two materials having different densities. According to such a configuration as well, the desired couple imbalance may be given to the intermediate disk of the cam member regardless of presence/absence the aforementioned blind hole.

In an embodiment of the art disclosed herein, a center of gravity of the intermediate disk of the cam member may be positioned on the rotation axis of the cam member. However, as another embodiment, the center of gravity of the intermediate disk of the cam member may not necessarily be positioned on the rotation axis of the cam member.

In an embodiment of the art disclosed herein, a diameter of the first eccentric cam may be equal to a diameter of the second eccentric cam. However, as another embodiment, the diameter of the first eccentric cam may not necessarily be equal to the diameter of the second eccentric cam.

In an embodiment of the art disclosed herein, a distance from the rotation axis of the cam member to the center of gravity of the first eccentric cam may be equal to a distance from the rotation axis of the cam member to the center of gravity of the second eccentric cam. However, as another embodiment, the distance from the rotation axis of the cam member to the center of gravity of the first eccentric cam may not necessarily be equal to the distance from the rotation axis of the cam member to the center of gravity of the second eccentric cam.

In an embodiment of the art disclosed herein, at least one of the first eccentric cam and the second eccentric cam may be connected to a corresponding one of the first blade and the second blade via at least one link. Alternatively, as another embodiment, at least one of the first eccentric cam and the second eccentric cam may be connected directly to its corresponding one of the first blade and the second blade.

In an embodiment of the art disclosed herein, an entirety of the first eccentric cam may be disposed on the upper surface of the intermediate disk. In addition, an entirety of the second eccentric cam may be disposed on the lower surface of the intermediate disk. However, as another embodiment, at least one of the first eccentric cam and the second eccentric cam may radially stick out beyond the intermediate disk.

Representative, non-limiting examples of the present disclosure will now be described in further detail with reference to the attached drawings. This detailed description is merely intended to teach a person of skill in the art further details for practicing aspects of the present teachings and is not intended to limit the scope of the present disclosure. Furthermore, each of the additional features and teachings disclosed below may be utilized separately or in conjunction with other features and teachings to provide improved gardening trimmers, as well as methods for using and manufacturing the same.

Moreover, combinations of features and steps disclosed in the following detailed description may not be necessary to practice the present disclosure in the broadest sense, and are instead taught merely to particularly describe representative examples of the present disclosure.

Furthermore, various features of the above-described and below-described representative examples, as well as the various independent and dependent claims, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

A gardening trimmer 10 of an embodiment will be described with reference to the drawings. The gardening trimmer 10 is a gardening tool that is primarily used for trimming hedges and trees, and is also called a hedge trimmer. As shown in FIG. 1, the gardening trimmer 10 comprises a body 12 and a pair of blades 14, 16 extending frontward from the body 12. The pair of blades 14, 16 is supported by a guide bar 18 fixed to the body 12. The guide bar 18 extends frontward from the body 12 along the pair of blades 14, 16. The gardening trimmer 10 is configured to trim branches and leaves of hedges and trees by reciprocating the pair of blades 14, 16 in opposite phases to each other.

The pair of blades 14, 16 includes a first blade 14 and a second blade 16. The first blade 14 includes a plurality of cutting edges 14*a* along a front-rear direction. Each of the cutting edges 14*a* protrudes leftward or rightward from the first blade 14. Similarly, the second blade 16 includes a plurality of cutting edges 16*a* along the front-rear direction. Each of the cutting edges 16*a* protrudes leftward or rightward from the second blade 16. When the first blade 14 and the second blade 16 reciprocate in opposite phases, the cutting edges 14*a* of the first blade 14 and the cutting edges 16*a* of the second blade 16 repeatedly slide across each other. Due to this, branches and leaves of hedges for example are trimmed.

The body 12 is configured to removably receive a battery pack 2. That is, the gardening trimmer 10 of the present embodiment is a cordless power tool that uses the battery pack 2 as its power source. Here, the number of the battery pack 2 is not limited to one, and the gardening trimmer 10 may be configured to use two or more battery packs 2. As another embodiment, the gardening trimmer 10 may be a power tool that is to be connected to an external AC or DC power source via a cable. Alternatively, the gardening trimmer 10 may be an engine-driven tool.

Figure 2:
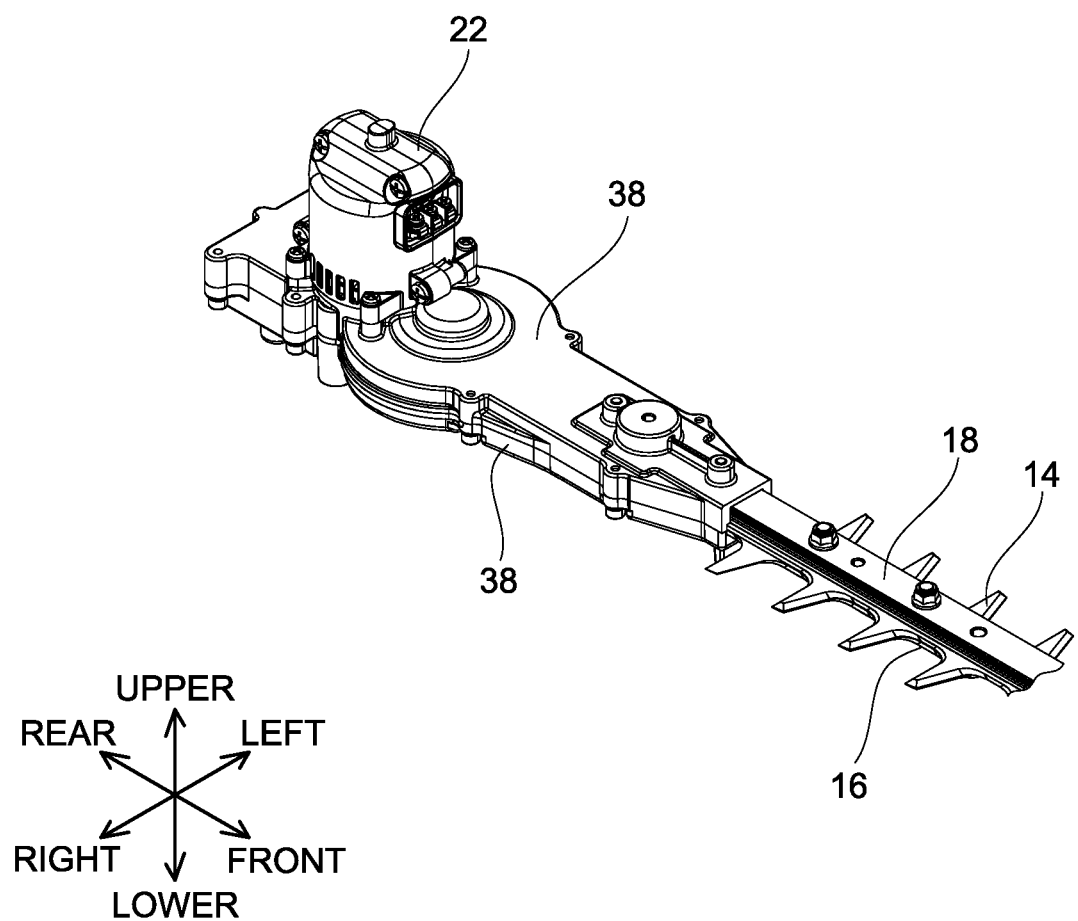
FIG. 2 is a perspective view showing an internal mechanism of the gardening trimmer 10.

As shown in FIGS. 1 and 2, the body 12 includes a housing 20, a cam casing 38 fixed to the housing 20, and a motor 22 fixed to the cam casing 38 inside the housing 20. The motor 22 is a prime mover for driving the pair of blades 14, 16 and is configured to operate by power supplied from the battery pack 2. A front grip 30 and a rear grip 32 are disposed on the housing 20. These grips 30, 32 are configured to be gripped by a user. Normally, the user grips the front grip 30 with his/her left hand and the rear grip 32 with his/her right hand to operate the gardening trimmer 10.

A drive switch 34 and an unlock switch 36 are disposed on the rear grip 32. When the user operates the drive switch 34, power is supplied from the battery pack 2 to the motor 22 and the motor 22 thereby drives the pair of blades 14, 16. However, in its normal state, the drive switch 34 is mechanically locked inside the housing 20, and the mechanical lock of the drive switch 34 is released only when the unlock switch 36 is being operated. Due to this, the pair of blades 14, 16 is prevented from being driven unintentionally by an erroneous operation on the drive switch 34.

Figure 3:
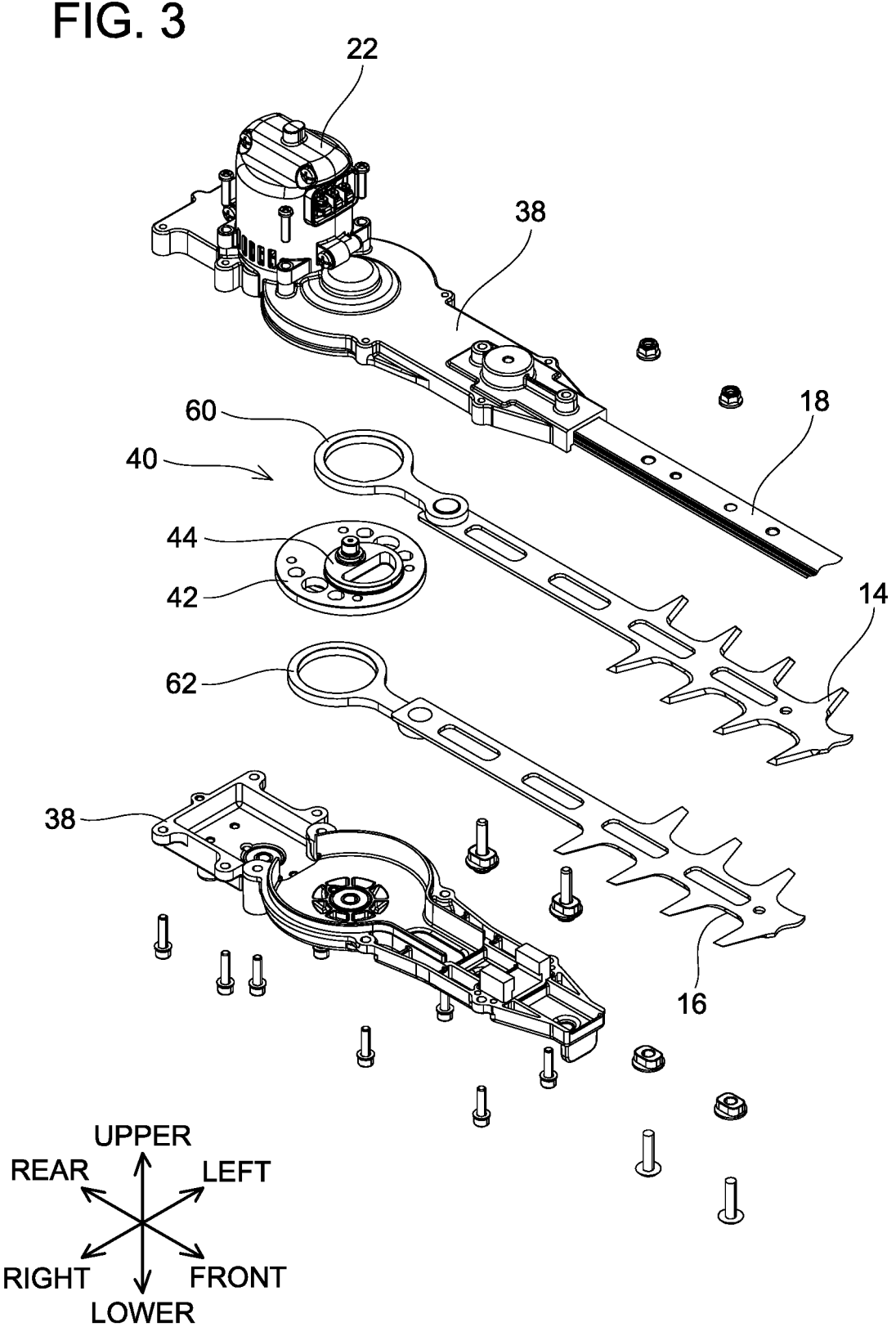
FIG. 3 is a perspective view showing the internal mechanism of the gardening trimmer 10 in a disassembled state.
Figure 4:
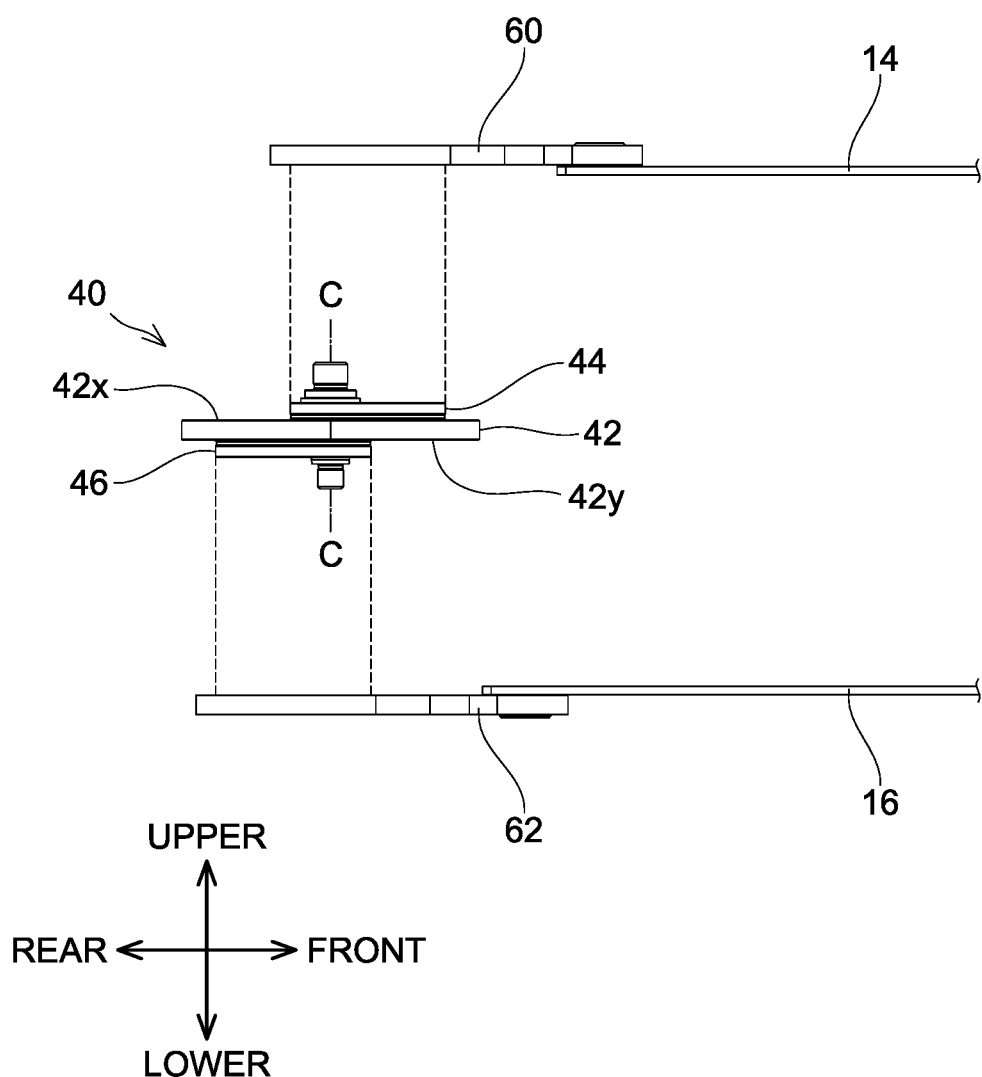
FIG. 4 is a side view showing a cam member 40 and a pair of blades 14, 16.

As shown in FIGS. 3 and 4, the gardening trimmer 10 comprises a cam member 40. The cam member 40 is constituted of, but not particularly limited to, metal. The cam member 40 is positioned inside the cam casing 38 and is rotatably held by the cam casing 38. The cam member 40 is connected to the motor 22 and is rotated by the motor 22. The cam member 40 comprises an intermediate disk 42, a first eccentric cam 44, and a second eccentric cam 46. The first eccentric cam 44 and the second eccentric cam 46 are fixed to the intermediate disk 42 and are configured to rotate integrally with the intermediate disk 42. Although this is merely an example, in the cam member 40 of the present embodiment, the first eccentric cam 44 and the second eccentric cam 46 are integral with the intermediate disk 42.

The first eccentric cam 44 is disposed on an upper surface 42x of the intermediate disk 42 and is offset in a first direction (rightward in FIG. 4) from a rotation axis C of the cam member 40. The first eccentric cam 44 is connected to the first blade 14 via a first link 60. The first eccentric cam 44 may be directly connected to the first blade 14 without intervention of the first link 60. The second eccentric cam 46 is disposed on a lower surface 42y of the intermediate disk 42 and is offset in a second direction (leftward in FIG. 4) opposite to the first direction from the rotation axis C of the cam member 40. The second eccentric cam 46 is connected to the second blade 16 via the second link 62. The second eccentric cam 46 may also be directly connected to the second blade 16 without intervention of the second link 62.

With the above configuration, when the cam member 40 rotates by the motor 22, the first eccentric cam 44 and the second eccentric cam 46 revolve about the rotation axis C of the cam member 40. When the first eccentric cam 44 revolves, the first blade 14 connected to the first eccentric cam 44 reciprocates along the front-rear direction. Similarly, when the second eccentric cam 46 revolves, the second blade 16 connected to the second eccentric cam 46 reciprocates along the front-rear direction. In doing so, the first eccentric cam 44 and the second eccentric cam 46 revolve in opposite phases to each other, thus the first blade 14 and the second blade 16 also reciprocate in opposite phases to each other.

Next, a detailed configuration of the cam member 40 will be described with reference to FIGS. 5, 6, and 7. The intermediate disk 42 of the cam member 40 has a disk shape, and a center axis thereof matches the rotation axis C of the cam member 40. A size of the intermediate disk 42 is sufficiently large such that an entirety of the first eccentric cam 44 is positioned on the upper surface 42x of the intermediate disk 42 and an entirety of the second eccentric cam 46 is positioned on the lower surface 42y of the intermediate disk 42. A helical gear for engaging with the motor 22 is disposed on an outer circumferential surface 42e of the intermediate disk 42. Further, the intermediate disk 42 has a plurality of through holes 43 defined therein for weight reduction of the cam member 40. A center of gravity G42 of the intermediate disk 42 is positioned on the rotation axis C of the cam member 40.

As aforementioned, the first eccentric cam 44 is offset in the first direction (rightward in FIG. 5) from the rotation axis C of the cam member 40. As such, a center of gravity G44 of the first eccentric cam 44 is also positioned in the first direction from the rotation axis C of the cam member 40 (see FIG. 5). On the other hand, the second eccentric cam 46 is offset in the second direction (leftward in FIG. 6) from the rotation axis C of the cam member 40. As such, a center of gravity G46 of the second eccentric cam 46 is also positioned in the second direction from the rotation axis C of the cam member 40 (see FIG. 6). Here, as shown in FIG. 7, the center of gravity G44 of the first eccentric cam 44 and the center of gravity G46 of the second eccentric cam 46 are located at different positions from each other in a direction parallel to the rotation axis C of the cam member 40 (that is, in a thickness direction of the cam member 40). Due to this, couple imbalance caused by the first eccentric cam 44 and the second eccentric cam 46 is present in the cam member 40, and such couple imbalance becomes a factor that generates unnecessary vibration and noise accompanying rotation of the cam member 40.

In regard to the above problem, the cam member 40 of the present embodiment comprises a first blind hole 48 and a second blind hole 50. The first blind hole 48 is defined in the first eccentric cam 44. The first blind hole 48 has a depth by which it passes through the first eccentric cam 44 and reaches the intermediate disk 42. However, the first blind hole 48 does not penetrate through the intermediate disk 42. On the other hand, the second blind hole 50 is defined in the second eccentric cam 46. The second blind hole 50 has a depth by which it passes through the second eccentric cam 46 and reaches the intermediate disk 42. The second blind hole 50 does not penetrate through the intermediate disk 42, either. According to such a configuration, a center of gravity G42a of an upper half 42a of the intermediate disk 42 proximate to the first eccentric cam 44 is positioned in the second direction (leftward in FIG. 7) from the rotation axis C of the cam member 40. Further, a center of gravity G42b of a lower half 42b of the intermediate disk 42 proximate to the second eccentric cam 46 is positioned in the first direction (rightward in FIG. 7) from the rotation axis C of the cam member 40.

Here, the upper half 42a and the lower half 42a of the intermediate disk 42 have a dimension (that is, thickness) being the same as each other in the direction parallel to the rotation axis C of the cam member 40. That is, the upper half 42a and the lower half 42a of the intermediate disk 42 is provided by dividing the thickness of the intermediate disk 42 into two equal parts along a plane H perpendicular to the rotation axis C of the cam member 40. The plane II shown in FIG. 7 is positioned at the center of the intermediate disk 42 in the thickness direction thereof, and matches a boundary between the upper half 42a and the lower half 42a.

The center of gravity G42a of the upper half 42a of the intermediate disk 42 and the center of gravity G42b of the lower half 42b of the intermediate disk 42 are located at positions different from each other in the direction parallel to the rotation axis C of the cam member 40 (that is, in the thickness direction of the cam member 40). Thus, couple imbalance is given deliberately to the intermediate disk 42 as well. As above, in the cam member 40 of the present embodiment, the couple imbalance is given deliberately to the intermediate disk 42 as well, and the couple imbalance caused by the first and second eccentric cams 44, 46 is at least partly cancelled by the couple imbalance of the intermediate disk 42. Due to this, couple imbalance of the cam member 40 as a whole is improved, and the unnecessary vibration and noise accompanying the rotation of the cam member 40 can be reduced.

In the present embodiment, the first blind hole 48 passes through the upper half 42a of the intermediate disk 42 and reaches the lower half 42b of the intermediate disk 42. However, the first blind hole 48 simply needs to reach the upper half 42a of the intermediate disk 42 at the least, and the depth thereof is not particularly limited so long as it does not penetrate through the intermediate disk 42. Similarly, the second blind hole 50 also simply needs to reach the lower half 42b of the intermediate disk 42 at the least, and the depth thereof is not particularly limited so long as it does not penetrate through the intermediate disk 42.

Figure 5:
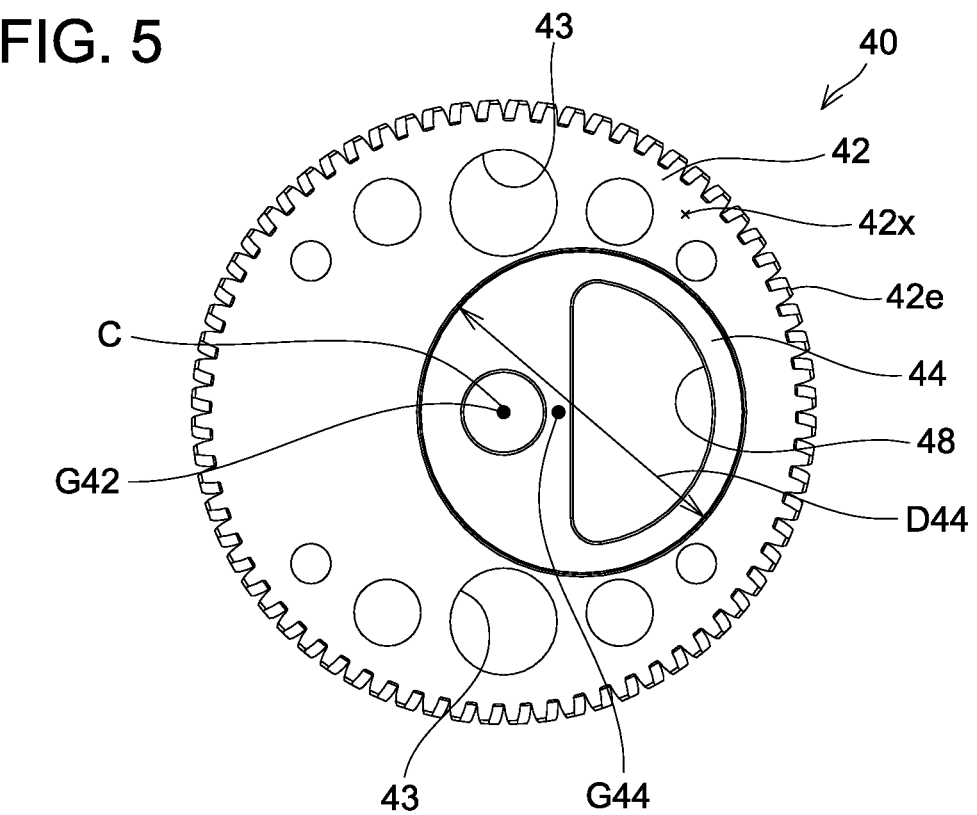
FIG. 5 is a plan view of the cam member 40 and shows an upper surface 42x of an intermediate disk 42 and a first eccentric cam 44.
Figure 6:
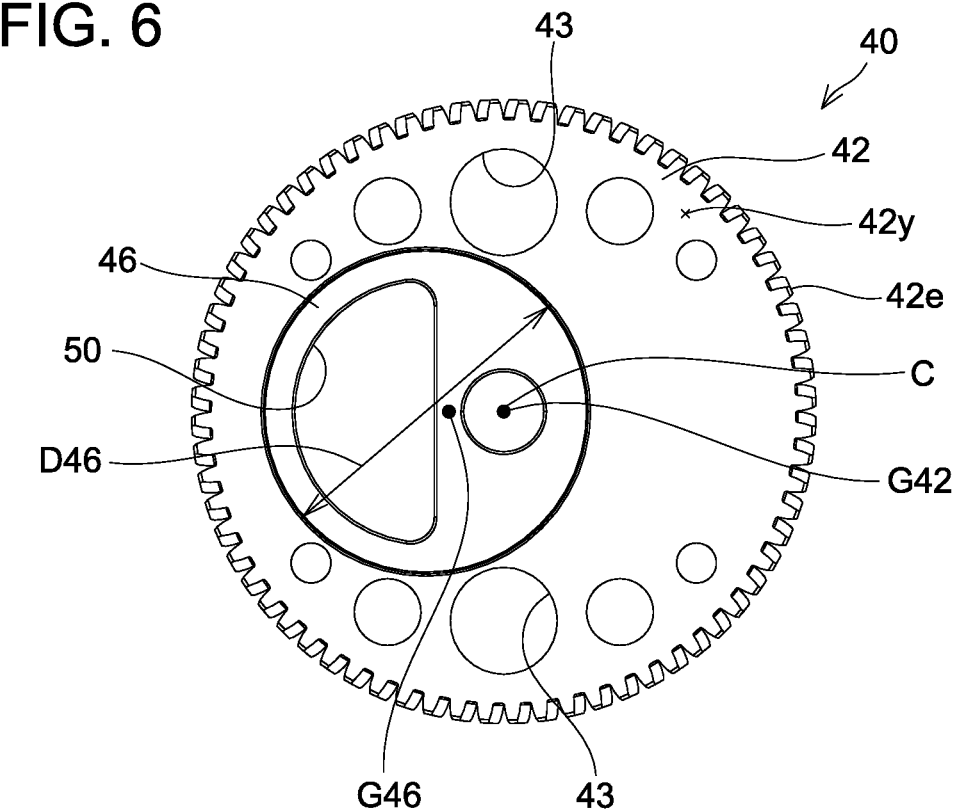
FIG. 6 is a bottom view of the cam member 40 and shows a lower surface 42y of the intermediate disk 42 and a second eccentric cam 46.
Figure 7:
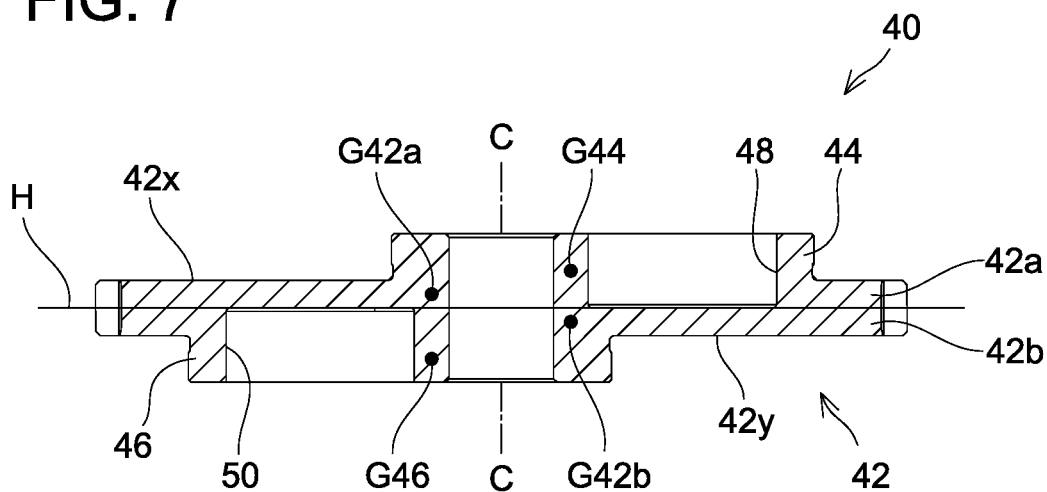
FIG. 7 is a cross-sectional view of the cam member 40.

In the present embodiment, as shown in FIGS. 5 and 6, the first blind hole 48 and the second blind hole 50 have the same shape and the center of gravity G42 of the intermediate disk 42 is positioned on the rotation axis C of the cam member 40 (see FIGS. 5 and 6). However, as another embodiment, the first blind hole 48 and the second blind hole 50 may have shapes different from each other, and in this case the center of gravity G42 of the intermediate disk 42 may not be positioned on the rotation axis C of the cam member 40.

In the present embodiment, as shown in FIGS. 5 and 6, a diameter D44 of the first eccentric cam 44 is equal to a diameter D46 of the second eccentric cam 46. However, as another embodiment, the diameter D44 of the first eccentric cam 44 may not necessarily be equal to the diameter D46 of the second eccentric cam 46. Further, in the present embodiment, a distance from the rotation axis C of the cam member 40 to the center of gravity G44 of the first eccentric cam 44 is equal to a distance from the rotation axis C of the cam member 40 to the center of gravity G46 of the second eccentric cam 46. However, as another embodiment, the distance from the rotation axis C of the cam member 40 to the center of gravity G44 of the first eccentric cam 44 may not necessarily be equal to the distance from the rotation axis C of the cam member 40 to the center of gravity G46 of the second eccentric cam 46.

Figure 8:
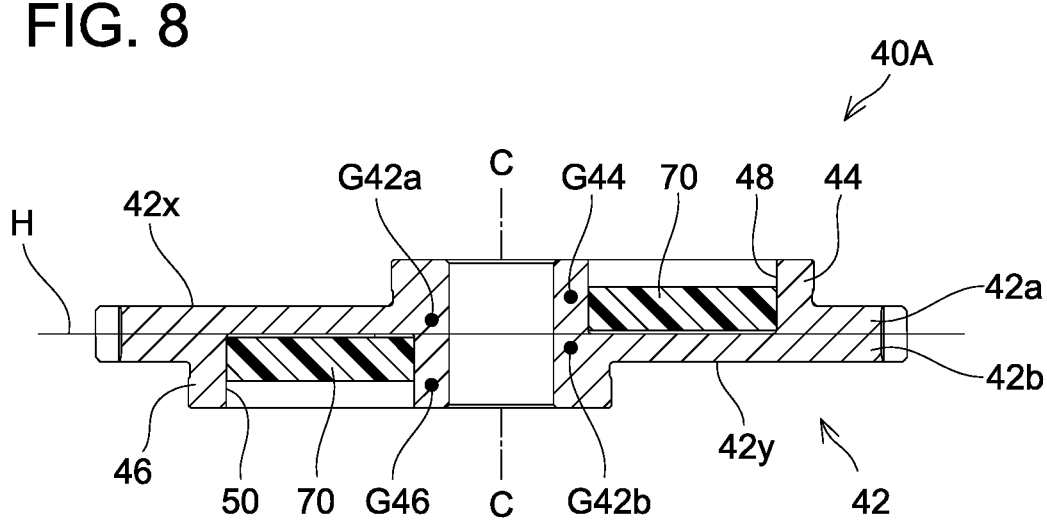
FIG. 8 is a cross-sectional view of a cam member 40A of a variant.

FIG. 8 shows a cam member 40A of a variant. In this cam member 40A, the first blind hole 48 and the second blind hole 50 are each at least partly filled by a filler member 70 having a smaller density than a material constituting the intermediate disk 42. According to such a configuration, for example, line adjustment may be made to the couple imbalance of the intermediate disk 42, and rigidity of the cam member 40 may be increased.

Figure 9:
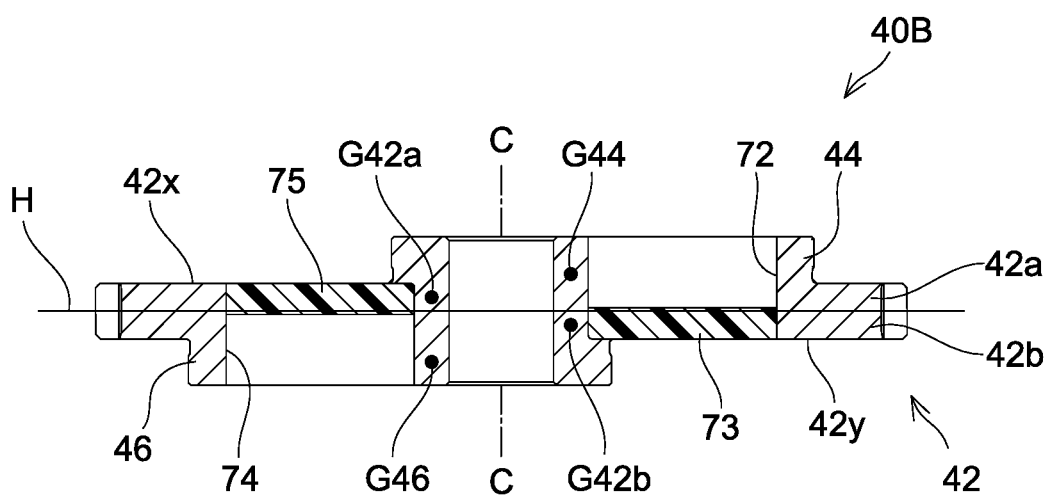
FIG. 9 is a cross-sectional view of a cam member 40B of another variant.

FIG. 9 shows a cam member 50B of another variant. In this cam member 40B, a first through hole 72 and a second through hole 74 are defined in the intermediate disk 42 instead of the first blind hole 48 and the second blind hole 50. Further, a first balancer 73 that is positioned in the lower half 42b of the intermediate disk 42 is disposed in the first through hole 72, and a second balancer 75 that is positioned in the upper half 42a of the intermediate disk 42 is disposed in the second through hole 74. The first balancer 73 and the second balancer 75 are constituted of a material having a different density from the material constituting the intermediate disk 42. As above, by combining two or more materials with different densities, the couple imbalance can be given to the cam member 40 without providing the first blind hole 48 and the second blind hole 50.

In the gardening trimmer 10 of the present embodiment, each of the first blade 14 and the second blade 16 is configured to reciprocate linearly. However, the art employed in this embodiment, especially a part of or all of the configuration employed in the cam member 40 may be employed in a gardening trimmer having blades configured to reciprocate in pivot motion.

In the gardening trimmer 10 of the present embodiment, each of the blades 14, 16 is of a so-called double-edge type having the cutting edges 14a, 16a on the both sides. However, each of the blades 14, 16 may be of a so-called single-edge type having the cutting edges 14a, 16a only on one side. Further, as another embodiment, the gardening trimmer 10 may be a pole hedge trimmer having blades configured to reciprocate at an end of an elongate pole and configured to trim hedges in higher spaces, a ridge mower for cutting weeds on ridge slopes, or a scythe mower (scythe mower) having its blades arranged at a front portion of a walk-behind mower and configured to reciprocate laterally relative to a traveling direction.

The invention claimed is:

1. A gardening trimmer comprising:
   a prime mover;
   a cam member configured to be rotated by the prime mover; and
   a first blade and a second blade connected to the cam member, the first blade and the second blade being configured to reciprocate in opposite phases to each other in accordance with rotation of the cam member,
   wherein the cam member comprises:
   an intermediate disk;
   a first eccentric cam disposed on an upper surface of the intermediate disk and connected to the first blade, a center of gravity of the first eccentric cam being offset in a first direction from a rotation axis of the cam member, the first direction being perpendicular to the rotation axis of the cam member;
   a second eccentric cam disposed on a lower surface of the intermediate disk and connected to the second blade, a center of gravity of the second eccentric cam being offset in a second direction opposite to the first direction from the rotation axis of the cam member;
   a first blind hole having a first opening defined on a surface of the first eccentric cam and a first bottom defined within the intermediate disk, the first blind hole extending from the first opening to the first bottom along the rotation axis of the cam member such that the first blind hole passes through the first eccentric cam; and
   a second blind hole having a second opening defined on a surface of the second eccentric cam and a second bottom defined within the intermediate disk, the second blind hole extending from the second opening to the second bottom along the rotation axis of the cam member such that the second blind hole passes through the second eccentric cam,
   wherein
   a center of gravity of an upper half of the intermediate disk proximate to the first eccentric cam is offset in the second direction from the rotation axis of the cam member,
   a center of gravity of a lower half of the intermediate disk proximate to the second eccentric cam is offset in the first direction from the rotation axis of the cam member, and
   the intermediate disk is divided equally into the upper half and the lower half by a boundary plane perpendicular to the rotation axis of the cam member, and the upper half and the lower half have a same thickness in a thickness direction parallel to the rotation axis of the cam member.

2. The gardening trimmer according to claim 1, wherein the first blind hole is at least partially filled with a filler member that has a smaller density than a material of the intermediate disk.

3. The gardening trimmer according to claim 1, wherein the intermediate disk of the cam member is constituted of at least two materials having different densities.

4. The gardening trimmer according to claim 1, wherein a center of gravity of the intermediate disk of the cam member is positioned on the rotation axis of the cam member.

5. The gardening trimmer according to claim 1, wherein a diameter of the first eccentric cam is equal to a diameter of the second eccentric cam.

6. The gardening trimmer according to claim 1, wherein a distance from the rotation axis of the cam member to the center of gravity of the first eccentric cam is equal to a distance from the rotation axis of the cam member to the center of gravity of the second eccentric cam.

7. The gardening trimmer according to claim 1, wherein at least one of the first eccentric cam and the second eccentric cam is connected to a corresponding one of the first blade and the second blade via at least one link.

8. The gardening trimmer according to claim 1, wherein
   the intermediate disk of the cam member is constituted of at least two materials having different densities, and
   a center of gravity of the intermediate disk of the cam member is positioned on the rotation axis of the cam member.

9. The gardening trimmer according to claim 8, wherein a diameter of the first eccentric cam is equal to a diameter of the second eccentric cam.

10. The gardening trimmer according to claim 8, wherein a distance from the rotation axis of the cam member to the center of gravity of the first eccentric cam is equal to a distance from the rotation axis of the cam member to the center of gravity of the second eccentric cam.

11. The gardening trimmer according to claim 8, wherein at least one of the first eccentric cam and the second eccentric cam is connected to a corresponding one of the first blade and the second blade via at least one link.

* * * * *